United States Patent
Rogers, Jr. et al.

(10) Patent No.: US 6,550,867 B2
(45) Date of Patent: Apr. 22, 2003

(54) SEAT RESTRAINT BUCKLE PRESENTER ASSEMBLY

(75) Inventors: Lloyd Walker Rogers, Jr., Shelby Township, MI (US); Theodore J Lindsay, Shelby Township, MI (US); Armeta Carson, Detroit, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/853,087

(22) Filed: May 10, 2001

(65) Prior Publication Data

US 2002/0167212 A1 Nov. 14, 2002

(51) Int. Cl.⁷ .......................... A62B 35/00; B60R 22/03
(52) U.S. Cl. ...................... 297/468; 297/473; 297/481; 280/808
(58) Field of Search ................................ 297/468, 481, 297/469, 473; 280/808, 806

(56) References Cited

U.S. PATENT DOCUMENTS

| | | | | |
|---|---|---|---|---|
| 4,262,963 A | * | 4/1981 | Bauer et al. ................. | 297/473 |
| 4,531,762 A | * | 7/1985 | Sasaki et al. ............ | 297/808 X |
| 4,629,214 A | * | 12/1986 | Fohl ........................... | 280/808 |
| 4,673,217 A | * | 6/1987 | Nishiyama et al. .......... | 297/473 |
| 4,818,022 A | * | 4/1989 | Nishimura .................... | 297/473 |
| 5,123,673 A | * | 6/1992 | Tame ...................... | 297/468 X |
| 5,322,348 A | * | 6/1994 | Johnson et al. .............. | 297/473 |
| 5,431,446 A | * | 7/1995 | Czarnecki et al. ....... | 297/481 X |
| 5,538,283 A | * | 7/1996 | Townsend ................ | 297/481 X |
| 5,918,926 A | * | 7/1999 | Townsend et al. .. | 297/411.32 X |
| 6,193,275 B1 | | 2/2001 | Knox ......................... | 280/808 |
| 6,267,409 B1 | * | 7/2001 | Townsend et al. ....... | 297/481 X |
| 6,279,954 B1 | * | 8/2001 | Townsend et al. ....... | 297/481 X |
| 6,308,986 B1 | * | 10/2001 | Townsend et al. ....... | 297/481 X |
| 6,352,312 B1 | * | 3/2002 | Rees ...................... | 297/473 X |
| 2002/0043872 A1 | * | 4/2002 | Townsend et al. .......... | 297/473 |

\* cited by examiner

*Primary Examiner*—Peter R. Brown
*Assistant Examiner*—Rodney B. White
(74) *Attorney, Agent, or Firm*—Kathryn A. Marra

(57) ABSTRACT

A seat restraint buckle presenter assembly for a seat restraint system in a vehicle includes a seat restraint buckle for receiving a latch plate of the seat restraint system. The seat restraint buckle presenter assembly also includes a buckle support connected to the seat restraint buckle and supporting the seat restraint buckle adjacent a seat of the vehicle. The seat restraint buckle presenter assembly further includes a drive mechanism cooperating with the buckle support for moving the buckle support and the seat restraint buckle longitudinally between a forward position and a rearward position.

14 Claims, 2 Drawing Sheets

SEAT RESTRAINT BUCKLE PRESENTER ASSEMBLY

TECHNICAL FIELD

The present invention relates generally to seat restraint systems for vehicles and, more particularly, to a seat restraint buckle presenter assembly for a seat restraint system in a vehicle.

1. Background of the Invention

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Typically, the webbing for the buckle of the seat restraint system is fixed to the seat or vehicle structure. In addition, the buckle is located in a fixed position toward a rear of the seat in the vehicle. Since the buckle is fixed or stationary, an occupant of the seat must locate the buckle to latch the latch plate with the buckle. However, it is desirable to allow an occupant to easily locate the buckle for a seat restraint system.

2. Summary of the Invention

It is, therefore, one object of the present invention to provide a seat restraint buckle presenter for a seat restraint system in a vehicle.

It is another object of the present invention to provide an assembly in a vehicle that moves a seat restraint buckle between a forward position and a rearward position.

To achieve the foregoing objects, the present invention is a seat restraint buckle presenter assembly for a seat restraint system in a vehicle including a seat restraint buckle for receiving a latch plate of the seat restraint system. The seat restraint buckle presenter assembly also includes a buckle support connected to the seat restraint buckle and supporting the seat restraint buckle adjacent a seat of the vehicle. The seat restraint buckle presenter assembly further includes a drive mechanism cooperating with the buckle support for moving the buckle support and the seat restraint buckle longitudinally between a forward position and a rearward position.

One advantage of the present invention is that a seat restraint buckle presenter assembly is provided for a seat restraint system in a vehicle. Another advantage of the present invention is that the seat restraint buckle presenter assembly enables a seat restraint buckle to be moved forward and rearward in a vehicle from one position to another for a seat restraint system in the vehicle. Yet another advantage of the present invention is that the seat restraint buckle presenter assembly has forward movement of the seat restraint buckle, which allows an occupant to see the buckle and latch the buckle with ease. Still another advantage of the present invention is that the seat restraint buckle presenter assembly moves the seat restraint buckle forward in the vehicle and allows the occupant to see the buckle, which may increase belt usage of the seat restraint system. A further advantage of the present invention is that the seat restraint buckle presenter assembly has the seat restraint buckle interlocked to a horizontal track of the seat.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
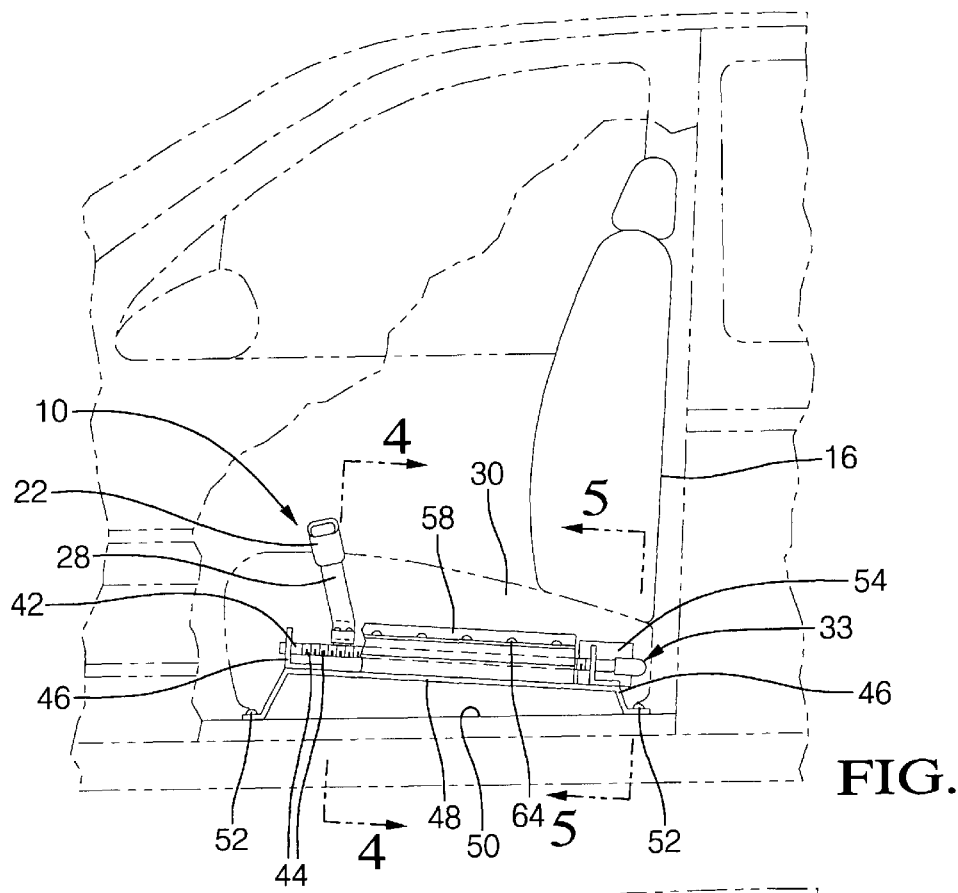
FIG. 1 is a fragmentary elevational view of a seat restraint buckle presenter assembly, according to the present invention, illustrated in operational relationship with a vehicle.
Figure 2:
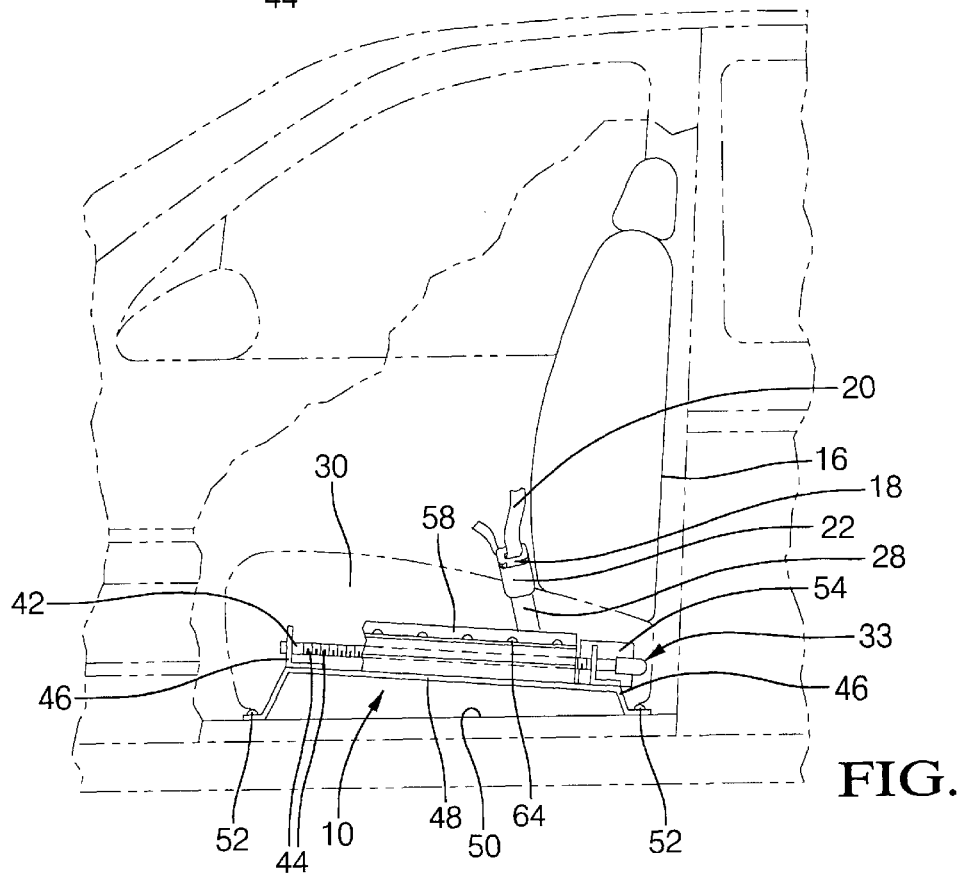
FIG. 2 is a view similar to FIG. 1 illustrating the seat restraint buckle presenter assembly of FIG. 1 in a buckled position.
Figure 3:
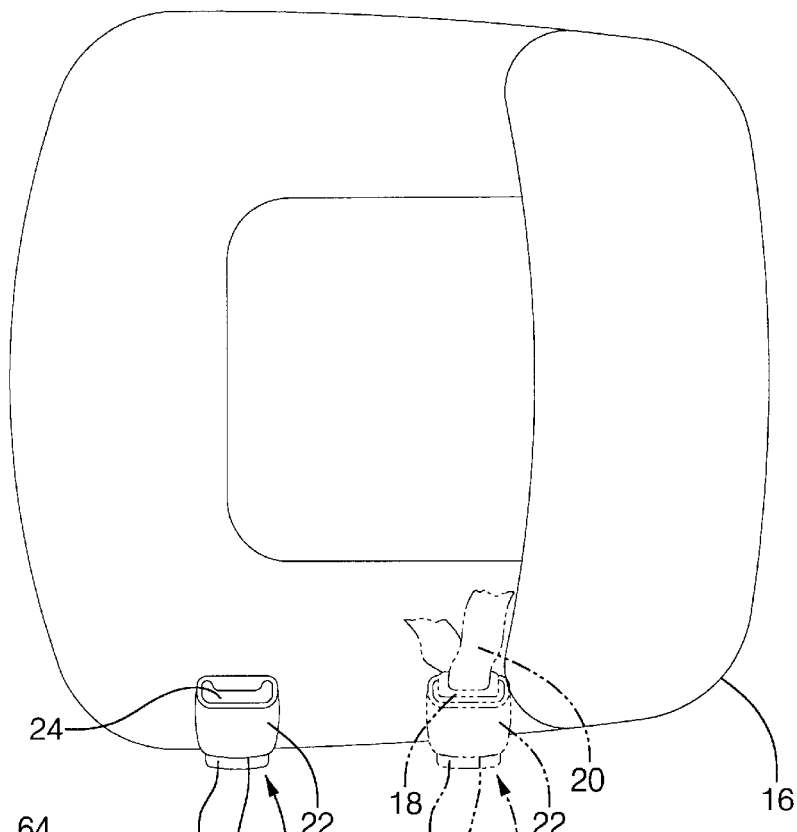
FIG. 3 is plan view of the seat restraint buckle presenter assembly of FIG. 1 illustrating the seat restraint buckle presenter assembly in an unbuckled position and a buckled position.
Figure 4:
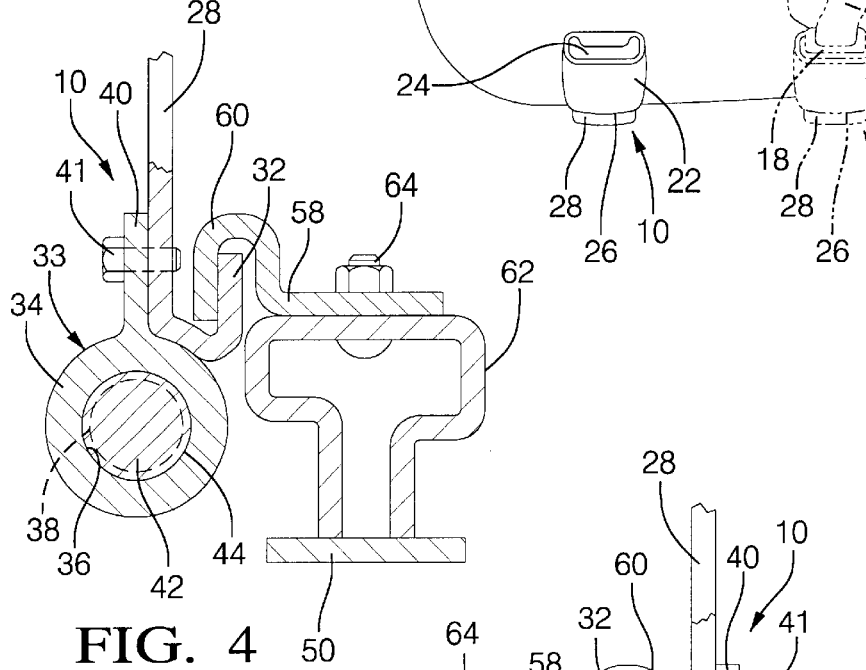
FIG. 4 is a sectional view taken along line 4—4 of FIG. 1.
Figure 5:
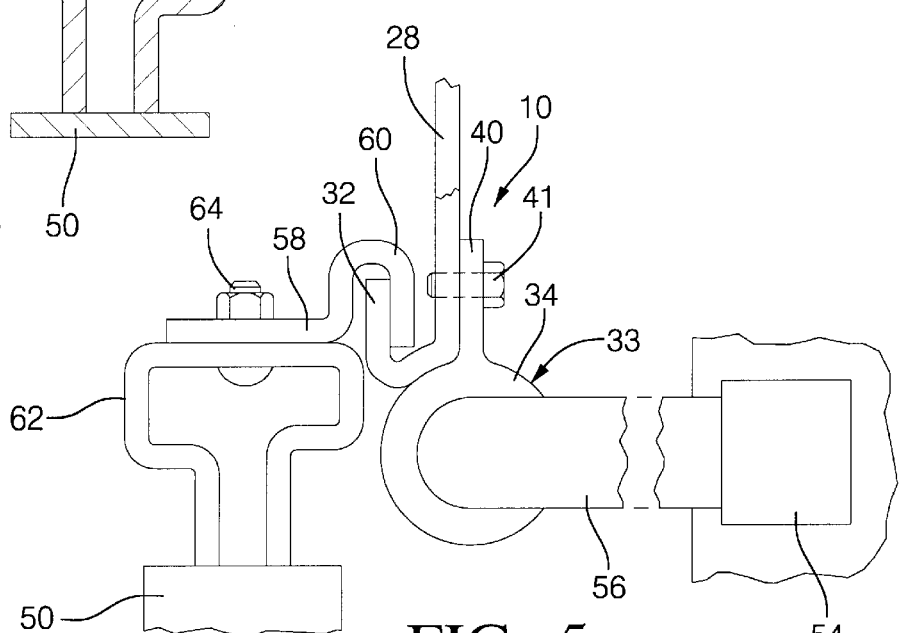
FIG. 5 is an end elevational view of the seat restraint buckle presenter assembly taken in the direction of arrow 5 of FIG. 1.

Referring to the drawings and in particular FIGS. 1 through 3, one embodiment of a seat restraint buckle presenter assembly 10, according to the present invention, is shown for a seat restraint system, generally indicated at 12, in a vehicle 14. The seat restraint system 12 is used for restraining an occupant (not shown) in a seat 16 of the vehicle 14. The seat restraint system 12 includes a latch tongue or plate 18 connected to an end of a belt 20 such as a lap belt, shoulder belt, or both which have another end connected to a retractor (not shown). The seat restraint system 12 also includes the seat restraint buckle presenter assembly 10 connected to the seat 16. The latch plate 18 has an aperture (not shown) extending therethrough and is engageable and disengageable with the seat restraint buckle presenter assembly 10 as illustrated in FIGS. 2 and 3. It should be appreciated that, except for the seat restraint buckle presenter assembly 10, the seat restraint system 12 is conventional and known in the art.

Referring to FIGS. 1 through 5, the seat restraint buckle presenter assembly 10, according to the present invention, includes a seat restraint buckle 22 for receiving the latch plate 18 and cooperating with the latch plate 18. The seat restraint buckle 22 has an open forward end 24 and an opposite rearward end 26 attached to a buckle support 28 to be described. It should be appreciated that the seat restraint buckle 22 may be similar to that disclosed in U.S. Pat. No. 5,271,129 to Clarke et al. It should also be appreciated that the seat restraint buckle 22 is conventional and known in the art.

The seat restraint buckle presenter assembly 10 also includes a buckle support 28 mounted to the rearward end 26 of the seat restraint buckle 22 to support the seat restraint buckle 22 adjacent a seat cushion 30 of the seat 16. The buckle support 28 is generally rectangular in shape. The buckle support 28 is preferably a plate member made of a rigid material such as metal. The buckle support 28 has a lower end 32 with a generally "J" cross-sectional shape for a function to be described. The buckle support 28 and extends upwardly from the lower end 32 preferably at an angle toward a front of the vehicle 14. It should be appreciated that the buckle support 28 is attached to the rearward end 26 of the seat restraint buckle 22 by suitable means such as fasteners (not shown).

The seat restraint buckle presenter assembly 10 includes a drive mechanism, generally indicated at 33, for moving the buckle support 28 and seat restraint buckle 22 between a forward unbuckled position and a rearward buckled position as illustrated in FIG. 3. The drive mechanism 33 includes a gear nut 34 attached to the buckle support 28. The gear nut 34 is generally cylindrical in shape with a generally circular cross-sectional shape. The gear nut 34 has an aperture 36 extending longitudinally therethrough and a plurality of threads 38 disposed about the aperture 36 for a function to be described. The gear nut 34 has a flange 40 extending outwardly and upwardly and is disposed adjacent the buckle support 28. The flange 40 is attached to the buckle support 28 by suitable means such as a fastener 41. The gear nut 34 is made of a rigid material such as metal. It should be appreciated that the fastener 41 is conventional and known in the art.

The drive mechanism 33 also includes a jackscrew 42 cooperating with the gear nut 34 for moving the gear nut 34 longitudinally. The jackscrew 42 is generally cylindrical in shape with a generally circular cross-sectional shape. The jackscrew 42 extends longitudinally and has a plurality of threads 44 disposed circumferentially thereabout and axially therealong. The jackscrew 42 extends through the aperture 36 of the gear nut 34 and the threads 44 of the jackscrew 42 cooperate with the threads 38 of the gear nut 34 to move the gear nut 34 longitudinally along the jackscrew 42 as the jackscrew 42 is rotated. The jackscrew 42 is made of a rigid material such as metal.

The drive mechanism 33 includes a plurality of, preferably a pair of end brackets 46 to rotatably support longitudinal ends of the jackscrew 42. The end brackets 46 are generally "L" shaped and have an aperture (not shown) extending therethrough to receive the jackscrew 42. The drive mechanism 33 also includes a floor bracket 48 extending longitudinally and attached to vehicle structure such as a floor 50 by suitable means such as fasteners 52. The end brackets 46 and floor bracket 48 are made of a rigid material such as metal. Preferably, the floor bracket 48 extends forwardly and upwardly at an angle, which is complementary to the angle of the seat cushion 30. The end brackets 46 are spaced longitudinally along the floor bracket 48 and secured thereto by suitable means such as welding. It should be appreciated that the end brackets 46 have a bearing (not shown) through which the jackscrew 42 extends to rotatably support the jackscrew 42.

The drive mechanism 33 further includes a motor 54 and a cable 56 interconnecting the motor 54 and the jackscrew 42 for rotating the jackscrew 42 by the motor 54. The motor 54 is of a seat motor type and is attached to vehicle structure such as the seat 16 by suitable means such as fasteners (not shown). The motor 54 is electrically connected to a power source such as a controller (not shown) via a vehicle ignition (not shown) to supply power to the motor 54 when the vehicle ignition is "On". The cable 56 is of a motion transmitting type that is rotatable by the motor 54 to rotate the jackscrew 42. It should be appreciated that the jackscrew 42 rotates, but does not translate, and the gear nut 34 translates relative to the jackscrew 42. It should also be appreciated that the motor 54 is reversible to allow the jackscrew 42 to rotate in opposite directions to move the gear nut 34 either forwardly or rearwardly along the jackscrew 42. It should further be appreciated that the motor 54 and cable 56 is conventional and known in the art.

The seat restraint buckle presenter assembly 10 includes a guide bracket 58 to guide the buckle support 28 during its movement. The guide bracket 58 extends longitudinally and has an edge 60 with a generally inverted "J" cross-sectional shape to cooperate with the end 32 of the buckle support 28. The guide bracket 58 is made of a rigid material such as metal. The guide bracket 58 is attached to vehicle structure such as a seat track 62 of the seat 16 by suitable means such as fasteners 64. It should be appreciated that the guide bracket 58 is stationary and that the buckle support 28 moves longitudinally relative to the guide bracket 58. It should also be appreciated that the guide bracket 58 guides the longitudinal movement of the buckle support 28 by the interaction between the edge 60 of the guide bracket 58 and the end 32 of the buckle support 28. It should further be appreciated that the buckle support 28 and guide bracket 58 provide a load path from the seat restraint buckle 22 to the floor 50 of the vehicle 14.

In operation, the seat restraint system 12 is illustrated in FIGS. 1 and 3 in an unlatched or unbuckled position in which the latch plate 18 is removed from the seat restraint buckle 22 of the seat restraint buckle presenter assembly 10. In this position, the vehicle ignition is "Off" and the seat restraint buckle 22 is in the forward unbuckled position. To fasten or latch the seat restraint system 12, the latch plate 18 is inserted into the open end 24 of the seat restraint buckle 22. A sensor (not shown) in the seat restraint buckle 22 sends a signal to a controller (not shown) that the seat restraint system 12 is latched or buckled and the controller activates the motor 54. Power is supplied to the motor 54 which rotates the cable 56 and jackscrew 42 to move the gear nut 34 rearward, which in turn, moves the buckle support 28 and seat restraint buckle 22 rearward to a buckled rearward position as illustrated in FIGS. 2 and 3.

In another mode of operation, the vehicle ignition is "On" and then the occupant latches the latch plate 18 with the seat restraint buckle 22. At this point, the seat restraint system 12 is in a latched or buckled position. The sensor in the seat restraint buckle 22 sends a signal to the controller that the seat restraint system 12 is latched or buckled and the controller activates the motor 54. It should be appreciated that the activation and operation of the motor 54 is the same as previously described. It should also be appreciated that the motor 54 is not activated until the latch plate 18 and seat restraint buckle 22 are latched and the vehicle ignition is "On".

To unlatch the seat restraint system 12 during operation, an occupant pushes or presses on a release button (not shown) of the seat restraint buckle 22. The seat restraint buckle 22 will then push the latch plate 18 out of the seat restraint buckle 22 and become unlatched. The sensor in the seat restraint buckle 22 sends a signal to the controller that the seat restraint system 12 is latched or buckled. However, the seat restraint buckle 22 will stay in the rearward buckled position until the vehicle ignition is turned "Off". Once this occurs, the controller will activate the motor 54 and power will be supplied to the motor 54, which rotates the cable 56 and jackscrew 42 in the opposite direction, to return the gear nut 34, buckle support 28, and seat restraint buckle 22 to the forward position.

In another mode of operation, when the vehicle ignition is turned "Off", the controller will activate the motor 54 and power will be supplied to the motor 54, which rotates the cable 56 and jackscrew 42 in the opposite direction, to return the gear nut 34, buckle support 28, and seat restraint buckle 22 to the forward position. The occupant pushes or presses on the release button of the seat restraint buckle 22. The seat restraint buckle 22 will then push the latch plate 18 out of the seat restraint buckle 22 and become unlatched. It should be appreciated that the seat restraint buckle presenter assembly 10 will move the seat restraint buckle 22 forward from the rearward position when the vehicle ignition is turned Off to allow the occupant to see the buckle 22 and unlatch and latch the buckle 22 with the greatest of ease.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat restraint buckle presenter assembly for a seat restraint system in a vehicle comprising:

a seat restraint buckle for receiving a latch plate of the seat restraint system;

a buckle support connected to said seat restraint buckle and supporting said seat restraint buckle adjacent a seat of the vehicle;

a drive mechanism cooperating with said buckle support for moving said buckle support and said seat restraint buckle longitudinally between a forward position and a rearward position; and a guide extending along and connected to a track of the seat to guide longitudinal movement of said buckle support, wherein said buckle support has a lower end and said guide has an edge cooperating with said lower end of said buckle support to operatively interlock said seat restraint buckle to the track of the seat.

2. A seat restraint buckle presenter assembly as set forth in claim 1 wherein said drive mechanism comprises a gear nut attached to said buckle support and a rotatable jackscrew cooperating with said gear nut to translate said gear nut longitudinally along said jackscrew.

3. A seat restraint buckle presenter assembly as set forth in claim 2 including at least one bracket for rotatably supporting said jackscrew.

4. A seat restraint buckle presenter assembly as set forth in claim 2 wherein said drive mechanism includes a motor and a cable interconnecting said motor and said jackscrew to rotate said jackscrew by said motor.

5. A seat restraint buckle presenter assembly as set forth in claim 2 wherein said gear nut includes an aperture extending therethrough and a plurality of first threads disposed along said aperture.

6. A seat restraint buckle presenter assembly as set forth in claim 5 wherein said jackscrew extends through said aperture and has a plurality of second threads for cooperating with said first threads.

7. A seat restraint buckle presenter assembly as set forth in claim 2 including means for fastening said buckle support and said gear nut together.

8. A seat restraint buckle presenter assembly as set forth in claim 1 including means for fixedly fastening said guide to a seat track of the seat.

9. A seat restraint buckle presenter assembly for a seat restraint system in a vehicle comprising:

a seat restraint buckle for receiving a latch plate of the seat restraint system;

a buckle support connected to said seat restraint buckle and supporting said seat restraint buckle adjacent a seat of the vehicle;

a gear nut attached to said buckle support;

a rotatable jackscrew cooperating with said gear nut for longitudinally translating said gear nut, said buckle support, and said seat restraint buckle longitudinally between a forward position and a rearward position; and a guide extending along and connected to a track of the seat to guide longitudinal movement of said buckle support, wherein said buckle support has a lower end with a general "J" shape and said guide has an edge with an inverted general "J" shape cooperating with said lower end of said buckle support to operatively interlock said seat restraint buckle to the track of the seat.

10. A seat restraint buckle presenter assembly as set forth in claim 9 wherein said gear nut includes an aperture extending therethrough and a plurality of first threads disposed along said aperture.

11. A seat restraint buckle presenter assembly as set forth in claim 10 wherein said jackscrew extends through said aperture and has a plurality of second threads for cooperating with said first threads.

12. A seat restraint buckle presenter assembly as set forth in claim 9 including a motor for supplying rotation and a cable interconnecting said motor and said jackscrew to rotate said jackscrew.

13. A seat restraint buckle presenter assembly as set forth in claim 9 including at least one bracket for rotatably supporting said jackscrew.

14. A seat restraint system for a vehicle comprising:

a latch plate;

a seat restraint buckle for receiving said latch plate;

a buckle support connected to said seat restraint buckle and supporting said seat restraint buckle adjacent a seat of the vehicle;

a drive mechanism including a gear nut attached to said buckle support and a rotatable jackscrew cooperating with said gear nut for longitudinally translating said gear nut, said buckle support, and said seat restraint buckle longitudinally between a forward position and a rearward position; and a guide extending along and connected to a track of the seat to guide longitudinal movement of said buckle support, wherein said buckle support has a lower end with a general "J" shape and said guide has an edge with an inverted general "J" shape cooperating with said lower end of said buckle support to operatively interlock said seat restraint buckle to the track of the seat.

* * * * *